United States Patent
Gaddy et al.

[15] 3,636,255

[45] Jan. 18, 1972

[54] OPTICAL SPECTRUM ANALYZER

[72] Inventors: Oscar L. Gaddy, Champaign; Nick Holonyak, Jr., Urbana, both of Ill.; Murray D. Sirkis, Boulder, Colo.; Jack R. Baird, Urbana, Ill.

[73] Assignee: KDI Corporation, Fairfax, Ohio

[22] Filed: Aug. 9, 1968

[21] Appl. No.: 751,524

[52] U.S. Cl. ................................178/6.8, 178/69.5, 356/79, 356/100

[51] Int. Cl. ........................................H04n 1/38, H04n 7/18

[58] Field of Search .....................178/6.8, 7.2, 69.5; 356/79, 356/100

[56] References Cited

UNITED STATES PATENTS

| | | | |
|---|---|---|---|
| 2,324,270 | 7/1943 | Schlesman | 178/6.8 |
| 2,404,939 | 7/1946 | Bailey | 178/7.2 |

OTHER PUBLICATIONS

Television Engineering Handbook, Fink, McGraw Hill, 1957, pp. 12- 2

Spectrographs, Bausch & Lomb, pp. 8- 16, Received GP 250, Nov. 5, 1968

*Primary Examiner*—Robert L. Griffin
*Assistant Examiner*—Joseph A. Orsino, Jr.
*Attorney*—Sughrue, Rothwell, Mion, Zinn & Macpeak

[57] ABSTRACT

A real time display of the optical spectrum of an incident beam of electromagnetic radiation is obtained by dispersing the beam into its component frequencies and focusing the dispersed component frequencies onto the face of a video pickup camera. Two different focal lengths are used for the dispersion means to provide either a complete optical spectrum or a partial optical spectrum on the face of the camera. The camera is scanned horizontally with each horizontal scan being displaced vertically to form a raster pattern scan even though the optical pattern on the camera face does not vary in the vertical direction. This provides greatly increased sensitivity and allows a narrower bandwidth video amplifier. The output of the amplifier and the horizontal scan control signals are applied to an auxiliary oscilloscope which displays the optical spectrum in an X-Y pattern.

2 Claims, 6 Drawing Figures

INVENTORS
JACK R. BAIRD, MURRY D. SIRKIS
NICK HOLONYAK, JR., OSCAR L. GADDY

BY Sughrue, Rothwell, Mion, Zinn & Macpeak
ATTORNEYS

INVENTORS
JACK R. BAIRD, MURRY D. SIRKIS
NICK HOLONYAK, JR., OSCAR L. GADDY

BY Sughrue, Rothwell, Mion, Zinn & Macpeak
ATTORNEYS

OPTICAL SPECTRUM ANALYZER

BACKGROUND OF THE INVENTION

The invention is in the field of optical spectrum analyzers.

It is known in the prior art to provide a record of the intensities of the various frequency components of input electromagnetic radiation. Typical of these known systems are those which pass the electromagnetic radiation through a dispersion prism or reflect the electromagnetic radiation from a deflection grating to separate the different wavelength components which form the composite electromagnetic radiation. The divergent component wavelengths are then selectively received by a detector which provides an output dependent upon the intensity of the selected wavelength component, or the entire optical spectrum of the dispersed components are focused onto a film which is then developed to provide a picture of lines representing individual wavelength components.

Neither the selective detection system nor the film detection system provides a real time display of the optical spectrum from the incident electromagnetic radiation. Furthermore, for the system using the film as described above, the intensity of the several components is indicated only by the darkness of the several lines, and that does not provide a very adequate indication of intensity for many purposes.

It has been proposed in the prior art to provide a real time X–Y display (wavelength versus intensity) by focusing the dispersed components onto the face of a video pickup camera tube and applying the output signals therefrom to an auxiliary oscilloscope. However, such prior proposals have not been satisfactory due to a lack of sensitivity, nonlinear scanning patterns, and relatively high noise outputs.

SUMMARY OF THE INVENTION

In accordance with the present invention, a real time X–Y display of the optical spectrum of a beam of electromagnetic radiation is provided on an auxiliary oscilloscope. The electromagnetic radiation is deflected off of either a first deflection grating or a second deflection grating each of which is separated from the face of a video pickup camera by a different distance. The different distances allow focusing of different bandwidth ranges of the optical spectrum onto the face of the camera. The resulting optical pattern on the face of the camera is a plurality of dark vertical lines, wherein the horizontal position of each vertical line represents the wavelength of the component and the darkness of each vertical line represents the intensity of the component. A raster pattern scan is performed in the video pickup camera and the video output on the target electrode is passed through a video amplifier and applied to the vertical control terminals of an auxiliary oscilloscope. The sawtooth waveform which controls the horizontal sweep of the video camera is applied to the horizontal control terminal of the auxiliary oscilloscope thereby providing a real time display on the face of the oscilloscope of wavelength versus intensity.

The vertical scan retrace of the video camera is synchronized to occur during one of the horizontal scan retraces, thereby eliminating the need for a separate blanking pulse during vertical retrace (i.e., the horizontal blanking pulse covers the vertical retrace). Since the pattern displayed upon the face of the video pickup camera does not vary in the vertical direction, the elimination of a separate vertical blanking pulse results in the signal output from the video camera having low-frequency component equal to the horizontal sweep frequency. This is contrasted with the normal operation of a video pickup camera wherein the lowest frequency component of the output signal is equal to the vertical scan frequency. Also, the sweep frequency is variable and the control means for varying the horizontal sweep frequency is tied to the video amplifier to also control the low-frequency response thereof.

Figure 4:
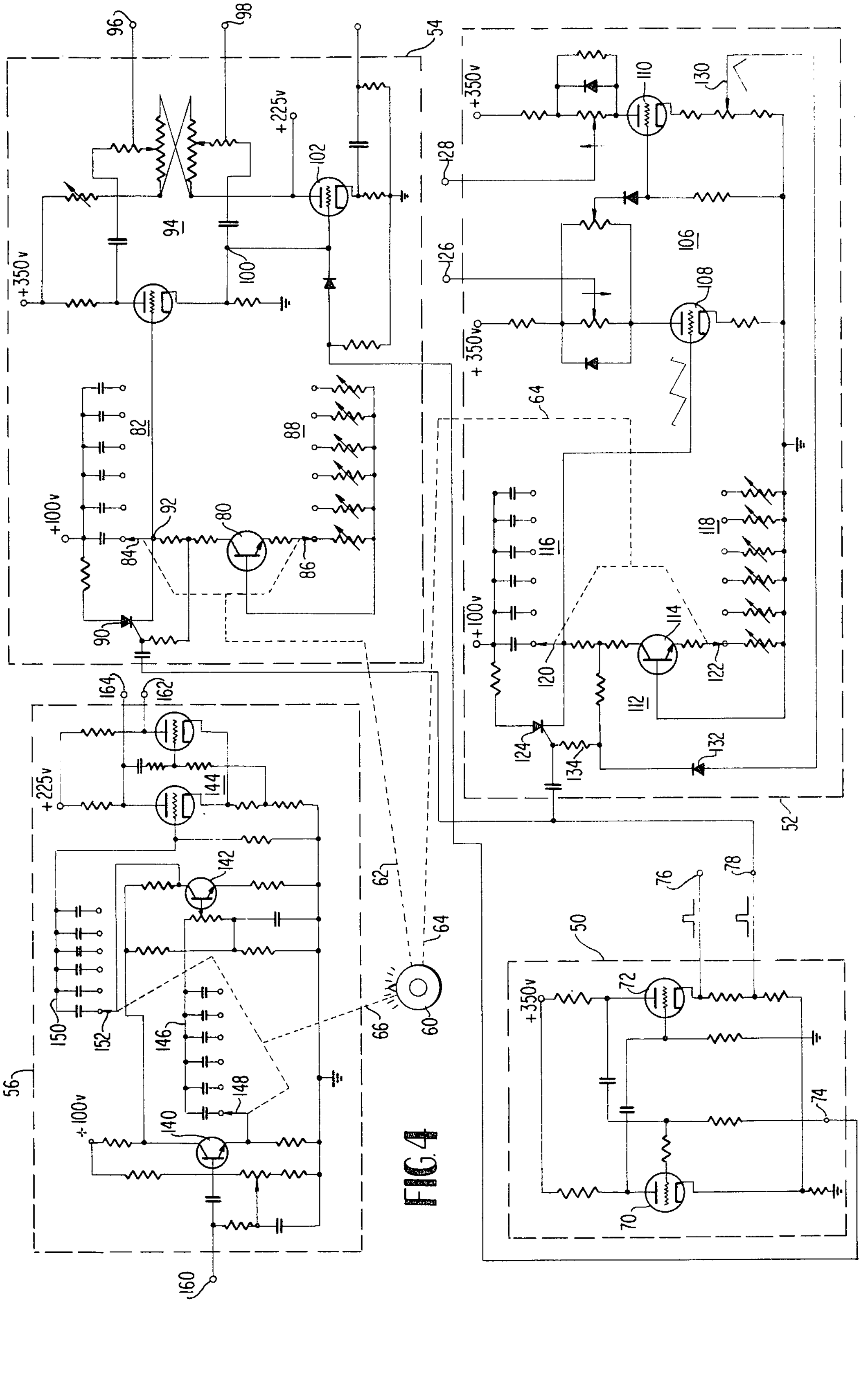
FIG. 4 is a schematic drawing of a preferred embodiment of a portion of the present invention.

FIGS. *5a* and *5b* comprise a waveform diagram showing different waveforms as they occur in the circuit of FIG. 4.

DETAILED DESCRIPTION OF THE PREFERRED EMBODIMENT

Throughout the discussion of the details of the preferred embodiment of the present invention, the terms vertical and horizontal will be used to describe coordinate directions. However, as will be obvious to anyone of ordinary skill in the art, the terms vertical and horizontal are relative, and it is not intended that the invention be limited to any specific direction in space.

Figure 1:
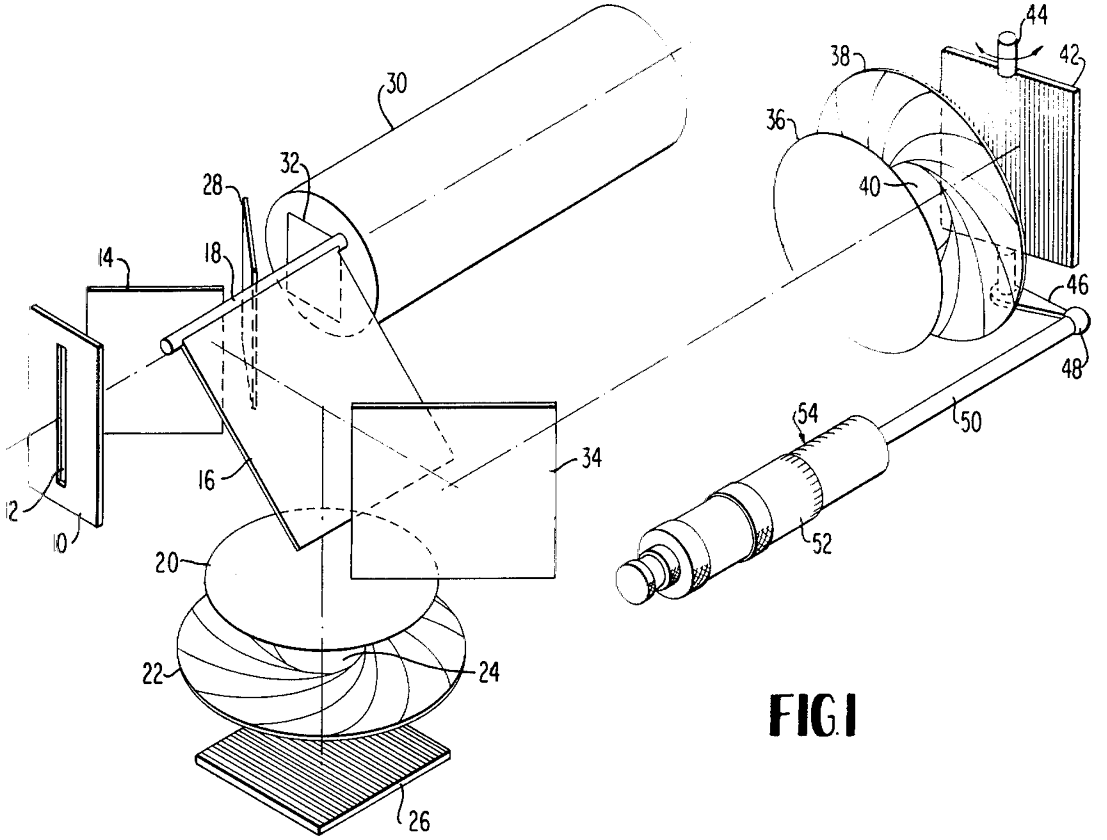
FIG. 1 is a perspective view of a preferred embodiment of the optical portion of the present invention.

In FIG. 1 the optical apparatus shown therein operates to focus a pattern of light onto a faceplate 32 of a video pickup camera 30. Many types of video pickup cameras are well known in the art, such as a vidicon and an image orthocon tube. These devices may be generally characterized as a video camera tube having a faceplate on which a pattern is focused, an electron beam with vertical and horizontal deflection controls therefor, and an output electrode on which appears a video signal dependent upon the pattern of light on said faceplate and a pattern of scanning. The optical system includes a first dispersion means comprising a collimating lens 20, an adjustable iris 22 having an opening therein 24, and a deflection grating 26. A second dispersion means comprises a collimating lens 36, an adjustable iris 38 having opening 40 therein, and a deflection grating 42. The deflection grating 42 is rotatably mounted on shaft 44 which is controlled by micrometer 52, arm 50, ball joint 48, and arm 46. The system also includes an input panel 10 having a slit 12, fixed plane mirrors 14, 28 and 34, and a plane mirror 16 attached to a rotatable shaft 18.

Figure 2:
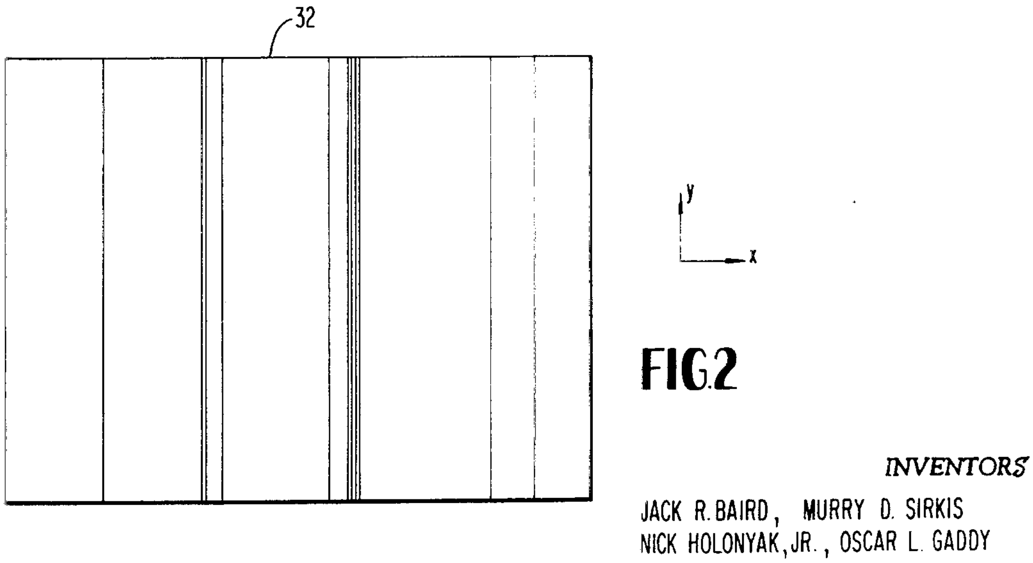
FIG. 2 is an example of a typical illumination pattern on the face plate of a video pickup camera.

In operation, a beam of electromagnetic radiation which passes through slit 12 of panel 10 is dispersed into its component wavelengths and focused onto the face plate 32 of the video pickup camera 30. The deflection gratings 26 and 42 are positioned so that the pattern of light focused onto the faceplate 32 will be constant in the vertical or Y-direction and will vary in the horizontal or X-direction. A typical illumination pattern appearing on the faceplate 32 is illustrated in FIG. 2. Each vertical line therein represents a particular wavelength component of the incident electromagnetic radiation. It should be noted that although typical video camera faceplates are adapted to detect visible electromagnetic radiation, such faceplates can be substituted with others for detecting invisible electromagnetic radiation such as infrared and ultraviolet radiation.

The optimum width of the slit 12 of faceplate 10 is equal to the smallest resolvable dimension on the particular video pickup camera being used. The slit, of course, may be larger or smaller than the optimum width but if it is larger there is a sacrifice in resolution and if it is smaller there is a sacrifice in sensitivity. The composite beam of electromagnetic radiation passes through slit 12 and is reflected off angularly positioned mirror 14 toward mirror 16. With mirror 16 in the position shown, the composite electromagnetic radiation will be reflected downward toward deflection grating 26 through collimating lens 20 and hole 24 in adjustable iris 22. As is well known to anyone of ordinary skill in the art, a deflection grating reflects the component frequencies of the composite input electromagnetic radiation at different angles thereby dispersing the incident radiation into its different frequency components. One advantage that deflection gratings have over dispersion prisms is that deflection gratings provide substantially linear patterns of frequency versus angular deflection whereas a dispersion prism provides a much less linear pattern. The deflected wavelength components pass up through iris 22 and collimating lens 20 to mirror 16. The radiation is reflected from mirror 16 to mirror 28 and from there to the faceplate 32 of the video pickup camera 30.

By rotating the shaft 18 to move mirror 16 to a substantially horizontal position, the composite radiation reflected by mirror 14 will pass to mirror 34 and be reflected toward grating 42 through the collimating lens 36 and the adjustable iris 38. Grating 42 is the same type of grating as grating 26 and reflects the component wavelengths at different angles. The component wavelengths pass through adjustable iris 38, collimating lens 36 and are deflected to the faceplate 32 by mirrors 34 and 28. The purpose of providing two deflection gratings which are selectively used is to enable the optical system to display a pattern of first and second optical bandwidths on the faceplate 32. For example, the position of grating 26 and lens 20 with respect to the faceplate 32 may be such that the entire optical spectrum is focused onto faceplate 32, whereas the grating 42 in combination with lens 36 may be placed at a position with respect to faceplate 32 to focus only a small portion of the optical spectrum onto the faceplate. As a specific example, the focal lengths of the lens 20 and 36, the specific deflection gratings 26 and 42, and their respective positions may be selected so that the combination of lens 20 and grating 26 provides a pattern on faceplate 32 which spans 3,000 angstroms, and the combination of grating 42 and lens 36 provides a pattern on the faceplate 32 which spans 300 angstroms. This provides a 10:1 ratio for the different dispersion means, allowing a single calibration scale. This may be accomplished by using the following specific components: a 600 line per millimeter grating 26, a 66 millimeter focal length lens 20, an 1,800 line per millimeter grating 42 and a 220 millimeter focal length lens 36.

Since the dispersion apparatus comprising grating 42 and lens 46 is selected and positioned to focus only a relatively small proportion of the optical spectrum onto faceplate 32, additional means is provided to vary the band of frequencies which is focused onto the faceplate 32 by the grating 42 and lens 36. This is accomplished by rotating the grating 42 about an axis which runs through the front face of the grating 42 in a vertical direction. The grating is connected to a shaft 44 which in turn is connected at the bottom thereof to arm 46. As the micrometer 52 is adjusted, arm 50 moves linearly causing arm 46 and shaft 44 to impart a rotational movement to the grating 42. By properly designing the length of the arm 46, the wavelength (in microns) of the light which is focused on the midpoint of the faceplate 32 will be equal to the micrometer reading (in inches) on micrometer scale 54. This can be accomplished by using an arm 46 which is 1.111 inches in length and adjusting the micrometer so that it reads zero when the grating 42 is perpendicular to the axis of incident radiation.

As is well known, a video pickup camera such as a vidicon tube includes an electron beam and horizontal and vertical deflection plates for deflecting the electron beam. As the beam scans across a spot on the faceplate of the vidicon tube, an output current will appear on the output electrode (known as the target electrode) which is proportional to the integral of the light intensity at the scan spot over the period T, where T is the time between successive scans of the spot. Thus, for a given intensity light beam focused onto a spot on the faceplate of a vidicon tube, the output current and thus the system sensitivity can be increased by decreasing the rate at which that spot is scanned. A decreased rate of scan allows more time for the intensity at the spot to buildup thereby providing a larger output current.

Figure 3:
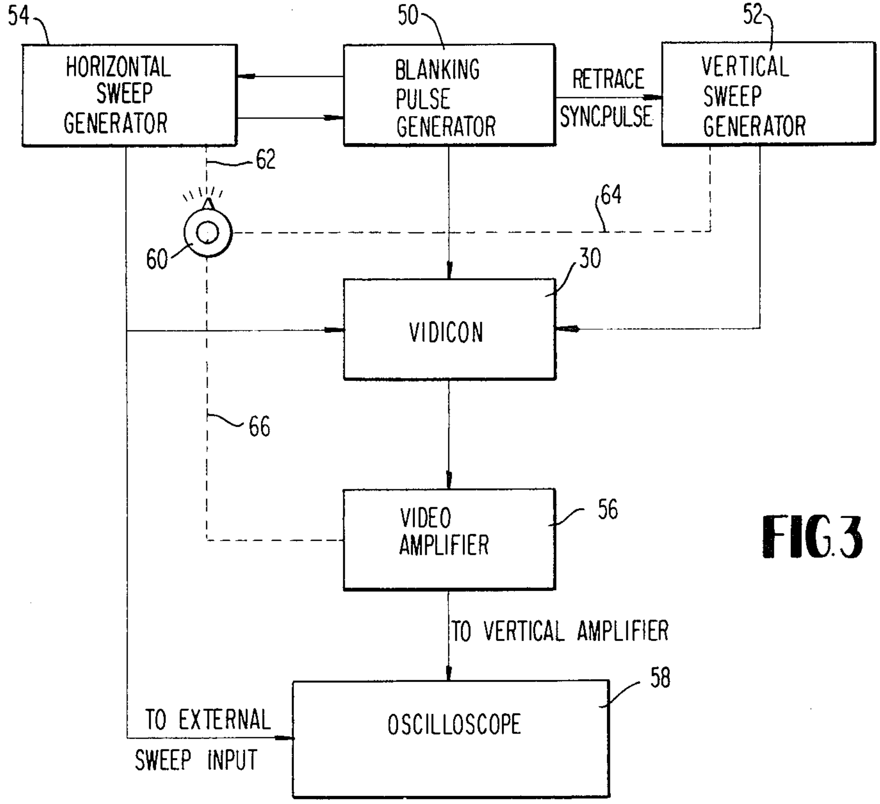
FIG. 3 is a block diagram of a preferred embodiment on the electronic portion of the present invention.

The particular manner of scanning the faceplate 32 is controlled by the system electronics which is shown in block diagram form in FIG. 3. The system which controls the vidicon 30, comprises a blanking pulse generator 50, a variable vertical sweep generator 52, and a variable horizontal sweep generator 54. The output of the vidicon 30 is applied via a variable frequency bandwidth video amplifier 56 to the vertical amplifier input terminal of an auxiliary oscilloscope 58. In operation, the blanking pulse generator 50 generates blanking pulses which are applied to the blanking input terminal of vidicon 30 to blank the vidicon in a manner well known in the art. The blanking pulse is also applied to the variable horizontal sweep generator 54 to initiate retrace of the horizontal sawtooth waveform. The sawtooth output from generator 54 is applied in a well-known manner to the horizontal deflection plates of the vidicon 30 to deflect the electron beam therein in a horizontal direction. The frequency of the sawtooth output from generator 54 determines the horizontal sweep frequency of the scanning beam within vidicon 30. The gradual sloping portion of the sawtooth waveform is referred to hereinafter as the scan portion, and the steep slope portion of the sawtooth waveform is referred to hereinafter as the retrace portion.

Referring back to FIG. 2, it is seen that a single horizontal sweep provides complete information of a spectrum pattern focused onto the faceplate of the vidicon. This is because there is no pattern variation in the vertical direction. However, in accordance with the present invention the beam is also scanned vertically at a rate much slower than the horizontal scan rate (about 500 horizontal lines per vertical sweep). By adding the vertical scan, the time between scans of a single spot is increased by a factor of 500 thereby providing a greatly increased sensitivity for the system. As shown in FIG. 3, the vertical sweep is controlled by the variable vertical sweep generator 52 which provides an output sawtooth waveform which is connected to the vertical deflection plates of the vidicon tube 30 in a manner well known in the art. During the scan portion of the sawtooth waveform the beam moves down the face of the vidicon and during the retrace portion of the sawtooth waveform the beam "flies back" to the top of the faceplate of the vidicon. Since the frequency of the horizontal sawtooth waveform is so much greater (500 times in the specific example) than the frequency of the vertical sawtooth waveform, the scanning pattern appears to be a series of substantially horizontal scans each displayed vertically from the preceding scan.

The horizontal sawtooth waveform is applied to the external (horizontal) sweep input of an auxiliary oscilloscope 58 and the signal output from the vidicon is applied via video amplifier 56 to the vertical amplifier input terminal of the oscilloscope 58. The result is a pattern on the face of oscilloscope 58 in which a graph of frequency versus intensity is displayed with the frequency being along the horizontal axis and intensity being along the vertical axis.

It is well known that many electronic instruments contain a noise component which varies with the reciprocal of the frequency. This is commonly referred to as 1/F noise. Vidicon outputs are generally rich in 1/F noise and therefore in order to have a satisfactory signal to noise ratio for the overall system it is necessary to reject as much of this 1/F noise as possible. This is accomplished in the present invention by making the low-frequency response of the video amplifier 56 as high as possible without blocking signal components of the vidicon output signal.

In the typical use of a vidicon tube, the video amplifier in the output circuit has a low-frequency response which is equal to the vertical sweep rate. This is necessary in order to allow all signal components to pass through the amplifier. However, in accordance with the present invention, the low-frequency response of the video amplifier 56 is made equal to the horizontal sweep frequency thereby greatly increasing the low-frequency response and greatly improving the signal to noise ratio. This can be done in the system of the present invention without blocking signal components of the vidicon output because the vidicon output signal is periodic with the horizontal sweep frequency whereas in normal vidicon operation the output signal is periodic with the vertical sweep frequency. However, in order to make the vidicon output signal perfectly periodic with the horizontal sweep frequency it is necessary that the normally present vertical blanking pulse be eliminated. This is accomplished in the present system by synchronizing the vertical retrace with the horizontal retrace and blanking the vidicon during horizontal retrace.

The manner in which the vertical and horizontal retrace portions are synchronized will be discussed in more detail in connection with FIG. 4.

For a constant input electromagnetic radiation (one which does not change with time) the horizontal sweep speed is made as low as the video pickup camera will allow to provide maximum sensitivity. However, for varying input radiation it will be necessary to increase the sweep speed so that the frame rate (determined by the vertical sweep rate) keeps up with the rate of change of the input radiation. That is, it is desirable to maintain a scan rate which results in a complete scan of a pattern before the pattern changes. In order to make the optical spectrum analyzer of the present invention flexible, it is necessary to provide a means for varying the sweep rate of the video camera tube. As illustrated in FIG. 3, this is accomplished by a switch 60 which is connected to the horizontal sweep generator 54 via linkage 62. It will also be noted that the dial 60 is connected via linkage 64 to the vertical sweep generator and via linkage 66 to the video amplifier 56. By varying the sweep rates of the vertical and horizontal sweep generators and the low-frequency response of the video amplifier simultaneously, the desired relationship between the sweep rates, and also between the horizontal sweep rate and the low-frequency response of the video amplifier are maintained.

FIG. 4 is a schematic diagram of the blanking pulse generator 50, the horizontal sweep generator 54, the vertical sweep generator 52, the video amplifier 56 and the interconnections. The blanking pulse generator 50 is a standard type of monostable multivibrator comprising triodes 70, 72 and the associated circuitry. The circuit components are selected in the manner well known in the art so that in the stable state, triode 70 is conducting and triode 72 is cut off. The output voltages at output terminals 76 and 78 are thus at their low level. When the voltage at the input terminal 74 reaches the cutoff level of tube 70, the monostable multivibrator is triggered resulting in positive output pulses at output terminals 76 and 78. The output pulse at 78 is applied to the vertical and horizontal sweep generators, and the output pulse at terminal 76 is applied to the cathode of the vidicon tube to blank the vidicon tube. The blanking pulse which is applied to the horizontal sweep generator 54 controls the retrace time of the horizontal sawtooth waveform.

The horizontal sweep generator 54 includes a charging circuit comprising capacitors 82, resistors 88, switch arms 84, 86, transistor 80, silicon controlled rectifier 90, and the associated resistors and voltages indicated. In the absence of a blanking pulse, the silicon controlled rectifier 90 is cut off and the capacitor 82 which is selected by switch arm 84 charges via the series charging circuit comprising the 100-volt source and the resistor 88 which is selected by switch arm 86. Switch arms 84 and 86 are ganged so that their movements correspond. A change in the position of the switch arms, as will be apparent to anyone of ordinary skill in the art, changes the time constant of the charging circuit and therefore changes the slope of the sawtooth produced at terminal 92.

Figure 5:
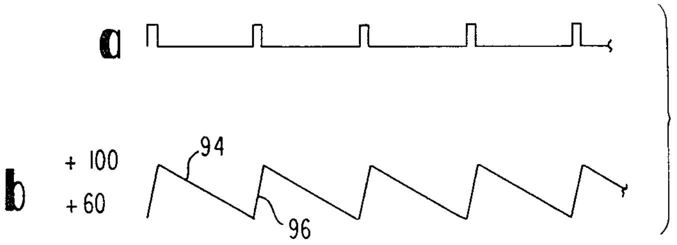

When a positive blanking pulse is received, it is applied to the gate of silicon controlled rectifier 90 thereby turning on the silicon controlled rectifier and discharging the capacitor 82 which is selected by switch arm 84. Charging of the capacitor will not begin again until the blanking pulse has been removed. Waveform (a) in FIG. 5 illustrates the blanking pulses applied to the silicon controlled rectifier 90 and waveform (b) illustrates the sawtooth waveform produced at terminal 92. The slope of the scan portion 94 of the sawtooth waveform is determined by the time constant of a charging circuit and the value of the supply voltage. The retrace portion 96 of the sawtooth waveform occurs in response to the blanking pulse. Since an output sawtooth waveform from the horizontal sweep generator 54 is applied to the input terminal 74 of the blanking pulse generator circuit 50, as will be explained more fully hereafter, the amplitude of the sawtooth remains unchanged even though switch arms 84 and 86 are positioned to select different capacitors and resistors 82 and 88 respectively. The parameter which does change with a change in the switch arm position is the sawtooth slope and concomitantly the duration of the scan portion of the sawtooth. Thus, a change in the position of switch arms 84 and 86 results in a variation of the horizontal sawtooth frequency which in turn varies the horizontal sweep rate of the vidicon.

The sawtooth waveform terminal 92 is connected to an amplifier 94 which amplifies, adjusts the DC level and provides positive and negative going sawtooth waveforms at output terminals 96 and 98 respectively. The output terminals 96 and 98 are connected to the horizontal deflection plates of the vidicon in a manner well known in the art. The amplifier 94 also has an output at terminal 100 which is applied to the cathode follower connected triode 102. The cathode follower 102 provides a sawtooth waveform at the output terminal 104 which is connected to the external (horizontal) sweep input of the auxiliary oscilloscope in a manner well known in the art. The output from amplifier 94 at terminal 100, which is a negative going sawtooth waveform such as that indicated in waveform (b) of FIG. 5, is applied also to the input terminals 74 of the blanking circuit 50. When the scan portion 94 of the sawtooth waveform reaches a predetermined level, said predetermined level indicating the end of the scan portion, the monostable multivibrator comprising triode 70 and 72 is triggered resulting in the blanking pulse which initiates retrace of the horizontal sawtooth waveform.

The vertical sweep generator 52 comprises a charging and discharging circuit 112 and an amplifier circuit 106. The charging and discharging circuit 112 produces a negative going sawtooth waveform which is similar to, but 500 times lower in frequency (for a 500 line per frame scan) than, the horizontal sawtooth waveform indicated by waveform (b) in FIG. 5. The latter sawtooth waveform, referred to hereinafter as the vertical sawtooth waveform, is applied to the amplifier 106, comprising triodes 108, 110 and the associated circuitry, which operates to amplify, invert and produce positive and negative sloped vertical sawtooth outputs at output terminals 126 and 128 respectively. The positive and negative going vertical sawtooth waveforms appearing at terminals 126 and 128 are connected to the vertical deflection plates of the vidicon tube in a manner well known in the art.

The charging circuit 112, is similar to the charging circuit in the horizontal sweep generator and comprises transistor 114, selectable capacitors 116, selectable resistors 118, switch arms 120 and 122, and silicon controlled rectifier 124. The switch arms 120 and 122 are ganged so that they are moved simultaneously to select different capacitors and resistors 116 and 118 respectively to thereby vary the frequency of the vertical sawtooth waveform. The values of the components in the charging circuit may be selected to provide output frequencies which are 500 times less than the output frequencies produced by the horizontal sawtooth generator 54. The switch arms 84 and 86 of the horizontal sawtooth generator are ganged with the switch arms 120 and 122 of the vertical sawtooth generator in order to maintain the frequency relationship between the vertical and horizontal sawtooths even when the switch arms are moved to vary the respective frequencies.

As discussed above in connection with FIG. 3, for the output of the vidicon to be perfectly periodic with the horizontal sweep rate, the vertical sawtooth retrace portion must be synchronized with the horizontal blanking pulse. This is accomplished by connecting the blanking pulses from the blanking pulse generator 50 to the gate terminal of the silicon controlled rectifier 124 of the vertical sawtooth generator 52. However, unlike the situation in the horizontal sawtooth generator, retrace of the vertical sawtooth is not initiated in response to every blanking pulse but is initiated only when the scanned portion of the vertical sawtooth waveform reaches a predetermined level, indicating the end of scan. Thus, an additional output from triode 110 of amplifier 106 is connected via potentiometer arm 130, diode 132, and resistor 134 to the gate terminal of silicon controlled rectifier 124. The values of the circuit components are selected so that the silicon controlled rectifier 124 is triggered only in response to the coincidence of a blanking pulse and a predetermined level of said vertical sawtooth waveform being reached. Fine adjustments of the frequencies of the horizontal and vertical sawtooth generators can be made by varying the resistors 118 and 88.

The output signals from the target electrode of the vidicon are applied to the video amplifier 56 at terminal 160. The video amplifier comprises a pair of transistor stages of amplification 140 and 142, and a stage of triode amplification 144. The stage of triode amplification provides a balanced outputs at output terminals 162 and 164 which are connected to the vertical main frame amplifier of the auxiliary oscilloscope in a manner well known in the art. Coupling between the amplifier stages is via selectable coupling capacitors 146 and 150. The coupling capacitors 146 are selected by switch arm 148 and the coupling capacitors 150 are selected by the switch arm 152, the switch arms being ganged to provide simultaneous switching. The values of the capacitors selected determines the low-frequency response of the video amplifier. Since the switch arms 148 and 152 are controlled by switch 60 via linkage 66, and since switch 60 also controls switching of the frequencies of the horizontal and vertical sawtooth generators, the relationship between the low frequency response of the video amplifier 56 and the sweep frequency is maintained even though the sweep frequency is varied. As will be well known to anyone of ordinary skill in the art, the low frequency response of the video amplifier is made equal to the horizontal sweep frequency by selecting the capacitors 146 and 150 so that the RC time constant of the coupling capacitors 146, 150 and the input resistances of the subsequent stages of amplification equals the inverse of the horizontal sweep frequency.

For any video amplifier the upper frequency response should be equal to the horizontal sweep rate times the number of resolvable lines per horizontal scan. The video amplifier of the present invention could be easily designed to have a variable upper frequency response which varies with the sweep rate. However, since high-frequency noise in the vidicon output is quite low it is not necessary to maintain the upper frequency response as low as possible and it can be made constant rather than variable.

While the invention has been particularly shown and described with reference to preferred embodiments thereof, it will be understood by those skilled in the art that various changes in form and details may be made therein without departing from the spirit and scope of the invention.

What is claimed is:

1. An optical spectrum analyzer comprising:

a video camera tube having a faceplate on which a pattern is focused, an electron beam and vertical and horizontal deflection controls therefor, and an output electrode on which appears a video signal dependent upon the pattern on said faceplate and a pattern of scanning, optical means responsive to optical electromagnetic radiation for dispersing said radiation into its component wavelengths and focusing at least a portion of said dispersed component wavelengths on said faceplate, first variable frequency sawtooth generator means for generating a first sawtooth waveform, said sawtooth waveform having a scan portion and a retrace portion and being connected to said horizontal deflection controls to cause said beam to scan in a first horizontal direction during said scan portion and to retrace in the opposite direction during said retrace portion, second variable frequency sawtooth generator means for generating a second sawtooth waveform having a frequency which is a substantial submultiple of the frequency of said first sawtooth waveform, said second sawtooth waveform having a scan portion and a retrace portion and being connected to said vertical deflection controls to cause said beam to scan in a first vertical direction during said scan portion and to retrace in the opposite vertical direction during said retrace portion, means connected to said first and second variable sawtooth generators and to said video camera for synchronizing said first and second sawtooth waveforms so that the retrace portion of said second sawtooth occurs in coincidence with the retrace portion of said first sawtooth and for blanking said video camera during said retrace portions, a video band-pass amplifier connected to said output terminal and having a variable low-frequency response substantially equal to the frequency of said first sawtooth waveform, and means connected to said first and second variable sawtooth generators and said video amplifier for varying the frequencies of said sawtooth waveforms and the low-frequency response of said video amplifier and maintaining the same relationship therebetween, wherein said means for synchronizing comprises:

a. a monostable multivibrator responsive to a predetermined voltage level at an input thereof for generating an output blanking pulse, b. means connecting said blanking pulse to said first sawtooth wave generator for initiating retrace of said first sawtooth waveform, c. means connecting said first sawtooth waveform to the input of said monostable multivibrator for triggering said monostable multivibrator when the voltage of said scan portion reaches said predetermined level, d. means connecting said blanking pulse to said second sawtooth wave generator for initiating retrace of said second sawtooth waveform when said second sawtooth waveform is above a second predetermined level, and e. means connecting said blanking pulse to said video camera for blanking said video camera during the duration of said blanking pulse.

2. An optical spectrum analyzer as claimed in claim 1 further comprising an auxiliary oscilloscope having horizontal and vertical deflection input terminals, said vertical deflection terminals being connected to said video amplifier output and said horizontal deflection terminal being connected to said first sawtooth waveform, and wherein said optical means comprises:

a. a first deflection grating and focusing lens associated therewith for deflecting the components of incident electromagnetic radiation at different angles dependent upon the wavelength of said components, said first deflection grating and focusing means being positioned with respect to said faceplate so that deflected components at substantially opposite ends of visible spectrum will be focused onto said faceplate, b. a second deflection grating and focusing leans associated therewith for deflecting the components of incident electromagnetic radiation at different angles dependent upon the wavelength of said components, said second deflection grating and focusing means being positioned with respect to said faceplate so that only a limited bandwidth of deflected components are focused onto said faceplate, said limited bandwidth being much smaller than the entire visible spectrum, c. means for selectively directing an incident beam of electromagnetic radiation toward said first and second deflection gratings, and d. rotating means connected to said second grating for rotating the plane of said grating to vary the band of deflection components which will be focused onto said faceplate.

* * * * *